Figure 1:
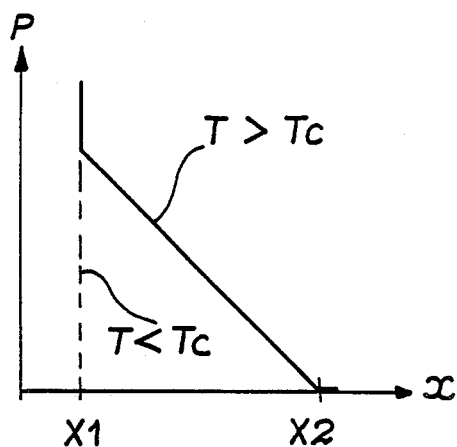

United States Patent [19]

Blin

[11] Patent Number: 4,897,006

[45] Date of Patent: Jan. 30, 1990

[54] DEVICE FOR EXERTING A PRESSURE DEVELOPING IN STAGES ON A PART

[75] Inventor: Michel Blin, La Ville du Bois, France

[73] Assignee: Aerospatiale Societe Nationale Industrielle, Paris, France

[21] Appl. No.: 237,746

[22] Filed: Aug. 29, 1988

[30] Foreign Application Priority Data

Sep. 4, 1987 [FR] France ................................ 87 12293

[51] Int. Cl.$^4$ .......................... F16B 33/00; F16B 43/02
[52] U.S. Cl. .................................... 411/368; 411/544; 411/909
[58] Field of Search ................ 411/11, 366, 368, 369, 411/531, 544, 909; 403/404; 267/161, 162

[56] References Cited

U.S. PATENT DOCUMENTS

| | | |
|---|---|---|
| 3,613,732 | 10/1971 | Willson et al. |
| 4,159,483 | 6/1979 | Bettin .................... 411/11 |
| 4,720,223 | 1/1988 | Neights et al. ........... 411/544 |
| 4,747,739 | 5/1988 | Bowman et al. .......... 411/368 |

FOREIGN PATENT DOCUMENTS

| | | |
|---|---|---|
| 2133084 | 11/1972 | France . |
| 1099472 | 1/1968 | United Kingdom .......... 411/11 |
| 2102904 | 2/1983 | United Kingdom . |

OTHER PUBLICATIONS

Article: "Alloys With Two Way Shape Memory Effect", Mechanical Engineering, vol. 102, Mar. 1980.
Article: "Master the Mysteries of Spring Washers", Product Engineering, vol. 50, No. 6.

Primary Examiner—Neill R. Wilson
Attorney, Agent, or Firm—Pearne, Gordon, McCoy & Granger

[57] ABSTRACT

Shape memory alloy spring washers passing from a flat shape to a truncated cone shape on exceeding a given critical temperature (Tc) can be stacked in opposition or in the same sense with identical and/or different washers, in order to bring about a development in stages of the pressure (P) applied by the stack of washers when the temperature (T) varies. These washers can advantageously be used for the bonding and polymerization of composite material parts (C), because they make it possible to simultaneously treat several parts in the same ventilated oven and in a less expensive manner.

8 Claims, 3 Drawing Sheets

DEVICE FOR EXERTING A PRESSURE DEVELOPING IN STAGES ON A PART

DESCRIPTION

The present invention relates to a device having at least one series of spring washers made from a shape memory alloy, so as to pass from the planar shape to a truncated cone shape or vice versa on exceeding a given temperature threshold. Such a device makes it possible to apply a pressure developing in stages to a part exposed to a preestablished temperature cycle.

In certain applications, such as the bonding and polymerization of composite material parts, the heating of the latter must be accompanied by pressurization, whereof it is desirable that it only takes place on exceeding a certain temperature. In more general terms, the production of composite material parts makes it necessary to simultaneously subject said parts to clearly defined temperature and pressure cycles.

In order to produce parts having a simple geometry, use is presently made of hydraulic heating presses, on which the parts are exposed to desired pressure cycles using tools of the mould-countermould type, whilst the heating cycle is determined by the heating system of the press. These hydraulic heating presses have the main disadvantages of not making it possible to produce parts having a complex shape and it is not possible to simultaneously produce on the same press parts requiring the application of different pressure cycles.

In order to produce composite material parts having complex shapes, use is presently made of autoclaves, within which the parts are generally moulded between a rigid mould and a bag. This method has the advantage of permitting the simultaneous production of parts with different shapes and dimensions. However, it is a costly method and the simultaneous production of several parts in the same autoclave is only possible if said parts accept the same temperature and pressure cycles.

Among the presently existing installations for the production of composite material parts, there is no installation which simultaneously makes it possible to produce several parts, whose production requires different pressure cycles for the same temperature cycle.

The first cycle objective of the present invention is to permit the production of composite material parts having random shapes with the aid of a simplified installation incorporating a ventilated oven for applying the desired temperature cycle to the parts.

To this end, it is proposed that the parts be individually exposed to the necessary pressure cycle during their bonding and polymerization by using shape memory alloy devices. More specifically, prior to being placed in the ventilated oven, each of the parts is placed in a tool of the mould-countermould type. Shape memory alloy devices sensitive to the temperature cycle defined by the oven act on the mould-countermould assembly in order to individually exert on the corresponding part a clearly defined pressure cycle. By associating one or more appropriate devices with each part, it consequently becomes possible to treat in the same oven parts requiring different pressure cycles.

It is pointed out that a shape memory alloy is a material which, plastically deformed under a critical temperature Tc, reassumes its initial shape as soon as the temperature rises above said critical temperature Tc. This characteristic is the result of a change of the crystalline structure at temperature Tc, due to a reversible phase transformation in the solid state between an austenitic state and a martensitic state.

Among shape memory alloys, a distinction is made between simple memory alloys and reversible memory alloys. In simple memory alloys, a deformation undergone in the martensitic state is definitively cancelled out during the passage to the austenitic state. However, in reversible memory alloys, a deformation undergone in the martensitic state is cancelled out during the passage into the austenitic state, but is reassumed during a subsequent passage to the martensitic state. The reverse transformation then takes place with a certain hysteresis.

The critical temperatures Tc corresponding to the passage from the martensitic state to the austenitic state can be adjusted in a relatively wide temperature range between approximately $-200°$ C. and $+120°$ C. by varying the composition of the alloy. For temperatures close to $-200°$ C., use is generally made of TiNi alloys, whereas temperatures approaching $+120°$ C. can generally be obtained by means of the CuZnAl or CnZnNi alloy. Studies showing the evolution of the critical temperature Tc as a function of the alloy have in particular been published by E. Aernoudt et al with title "Capacity for Shape Memory and High Damping in CuZnAl Alloys" in Metall, December 1977, vol. 31.

The production of shape memory effect parts is difficult, particularly with regards to the composition of the alloy and in particular the heat treatment. In the present state of the art, shape memory alloy parts can only be produced on request, which implies very significant production delays, which are unacceptable when it is necessary to produce single parts with short delays, as is often the case in the field of tools used for the production of composite material parts.

Bearing in mind the industrial requirements, it is consequently not reasonable to envisage the production of shape memory devices adapted to each of the composite material parts to be produced within the framework of an installation using a simple ventilated oven.

In order to solve this problem the present invention proposes the use of shape memory devices constituted by the assembly of several modular elements constituted by conical washers which can be produced in large quantities, whereas the number of different types of washers can be limited.

More specifically, the present invention relates to a device for applying a pressure developing in stages to a part exposed to a predetermined temperature cycle, said device being characterized in that it comprises at least one stack of elementary washers mounted on a rod provided with abutments at its ends and transversing two pressure plates between which said part is placed, said stack having at least one series of spring washers made from a shape memory alloy, so as to pass from a planar or flat shape to a truncated cone shape on exceeding given temperature thresholds of said temperature cycle.

It is readily apparent that by stacking a different number of washers, by varying the sense of said stack and optionally by adding thereto standard spring washers, it is possible to apply to a given part a pressure cycle which can significantly vary, even if all the shape memory alloy spring washers are identical. If in addition there are available several types of shape memory alloy spring washers, these possibilities are further significantly increased.

The shape memory alloy spring washers can be produced either from a simple shape memory alloy, or a reversible shape memory alloy. These spring washers can also either have a conical shape, or a planar shape below a given temperature threshold.

Each stack of washers can comprise at least one series of washers mounted in opposition and/or at least one series of washers mounted in the same sense.

Preferably, all washers of the stack have an identical internal diameter and an identical external diameter, said diameters being e.g. the same as those of the standard spring washers, in order to permit the use of the latter in certain stacks.

Figure 2:
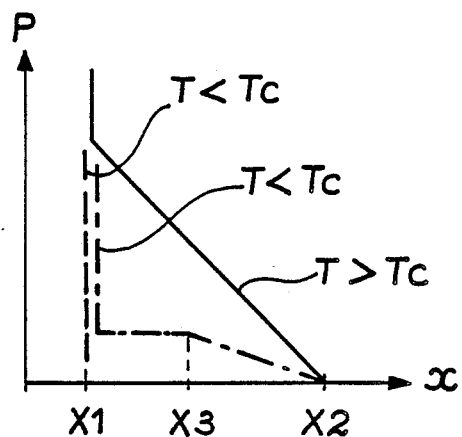

The invention will now be described in greater detail relative to non-limitative embodiments and the attached drawings, wherein show:

FIGS. 1 and 2 Pressure P/thickness x graphs of the two spring washers made respectively from a reversible shape memory alloy R and a simple shape memory alloy S.

Figure 3:
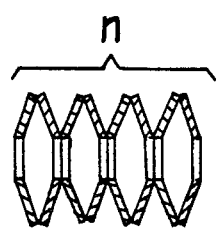

FIG. 3 A stack of spring washers usable in the device according to the invention and mounted in opposition.

Figure 4:

FIG. 4 A stack of spring washers usable in the device according to the invention and mounted in the same sense.

Figure 5:
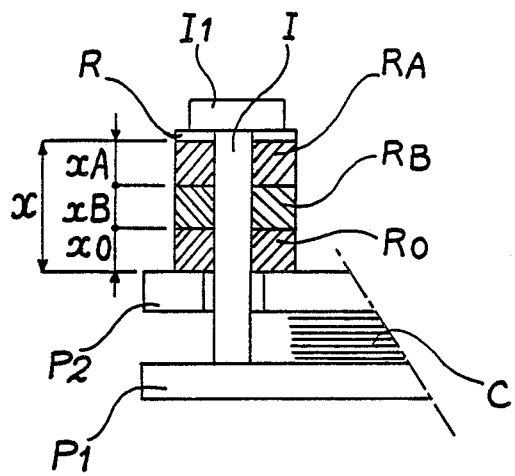

FIG. 5 Diagrammatically part of a device according to the invention having a stack formed from three types of different elementary washers mounted on a rod, in order to apply a given pressure cycle to a part.

Figure 6:
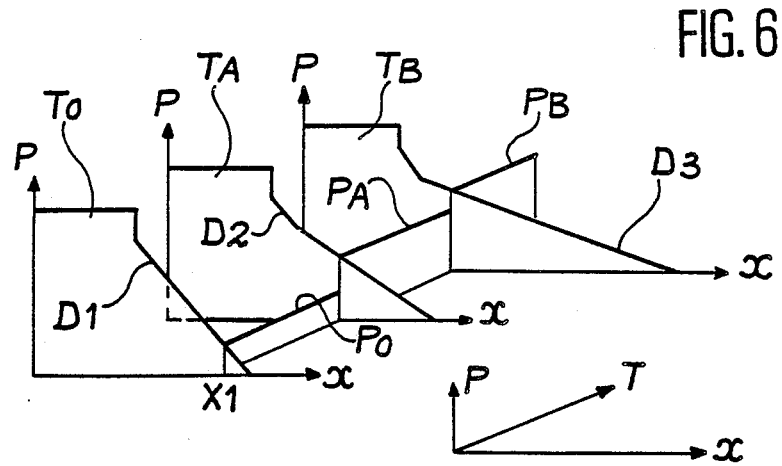

FIG. 6 A pressure P/thickness x graph of the stack of FIG. 5 at different temperatures T.

Figure 7:
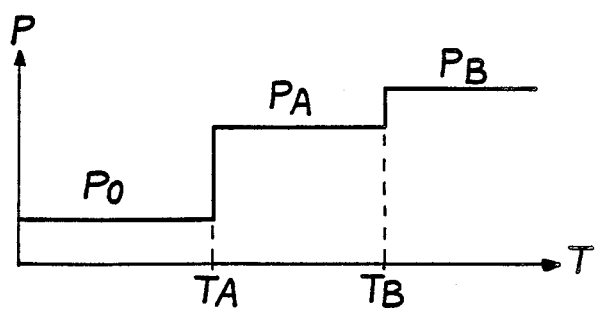

FIG. 7 The pressure cycle P as a function of the temperature T obtained with the aid of the stack of FIG. 5.

Figure 8:
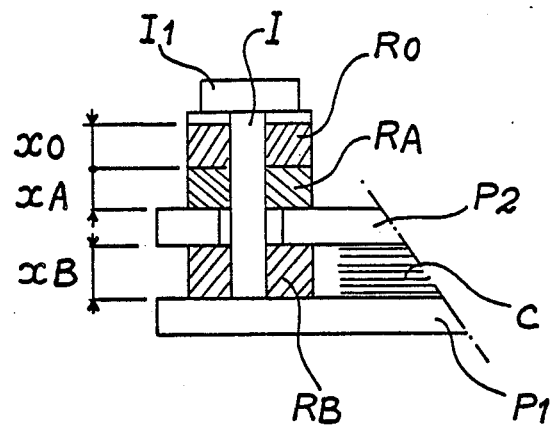

FIG. 8 Diagrammatically part of a device comparable to that of FIG. 5, in which the realization of the stack of elementary washers makes it possible to obtain a pressure cycle including the load reduction phase.

Figure 9:
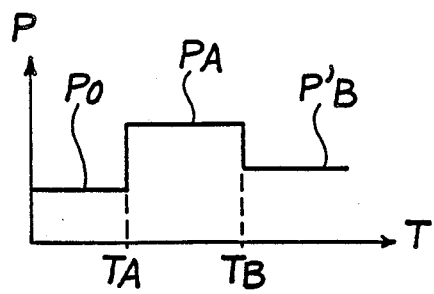

FIG. 9 The development cycle of the pressure P of the assembly of FIG. 8 as a function of the temperaure T.

Figure 10:
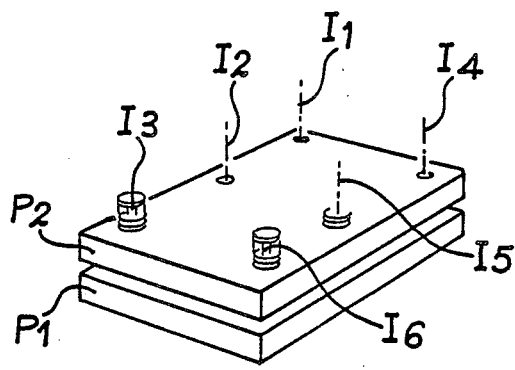

FIG. 10 Diagrammatically a device using spring washers according to the invention and which can be placed in a ventilated oven for producing a composite material part.

As has been stated hereinbefore, the invention uses spring washers made from shape memory alloy, so as to pass from a planar shape to a truncated cone shape on exceeding a given temperature threshold.

By convention, the symbol + is allocated to the elastic washers, whose shape change resulting from the passage from the martensitic state to the austenitic state corresponds to the passage from the flat shape to the conical shape. Conversely, the symbol − is allocated to the washers in which said shape change corresponds to the passage from the conical shape to the flat shape.

In view of the fact that the shape memory of the material constituting the washer can be simple S or reversible R, for the same dimension and for a given critical transformation temperaure Tc, there are four types of washers, which can be designated by the symbols S+, R+, S− and R−.

FIG. 1 is the pressure P/thickness x graph of a type R+ washer. It is possible to see in dotted line form therein that below the critical temperature Tc, said washer of thickness $X_1$ is incompressible. However, as is shown by the continuous line curve of FIG. 1, above the temperature Tc, the washer assumes a conical shape of thickness $X_2$ in the free state, said thickness decreasing to $X_1$ when the pressure increases. The slope K of the curve corresponds to the stiffness. When the temperature again drops below Tc, the shape of the washer is modified again and the washer again becomes flat.

FIG. 2 is a pressure P/thickness x graph of a spring washer of type S+ according to the invention. As hereinbefore, below the critical temperature Tc, the washer is flat, of thickness $X_1$ and incompressible (dotted line curve). Above the temperature Tc, the washer becomes conical and has a stiffness curve K (continuous line curve). Finally, when the temperature again drops below Tc (mixed line curve), the washer remains conical, but its stiffness K' is below the stiffness K. When the washer thickness drops below a value $X_3$, the deformation of the washer can become plastic.

FIG. 3 shows a stack of n identical spring washers, which are of type R+ or type S+ mounted in opposition. Compared with a unitary washer, the stiffness of the assembly is divided by n and the maximum amplitude of the deformation of the stack is multiplied by n.

FIG. 4 shows that p spring washers according to the invention of type R+ or S+ can also be stacked in the same sense or direction. Compared with a unitary washer, the stiffness of the assembly is then multiplied by p, as well as the maximum permissible pressure. However, the maximum amplitude of the deformation is unchanged.

Obviously, the stacks of FIGS. 3 and 4 can be combined. Thus, by stacking in opposition n groups of p washers stacked in the same direction, a stiffness multiplied by p/s, a maximum pressure multiplied by p and a maximum amplitude multiplied by n are obtained compared with a unitary washer, assuming that all the washers are identical.

A variable stiffness can also be obtained by stacking in opposition n groups, each formed by a number p of different washers stacked in the same direction.

Thus, according to the invention, it is possible on the basis of a single type of washer to obtain a wide displacement amplitude and stiffness range. Thus, the set objective is clearly achieved.

FIG. 5 very diagrammatically shows an assembly comprising a stack formed from elastic washers of three different types, but having the same internal and external diameters. More specifically, said stack comprises a first assembly of shape memory alloy elastic washers $R_A$ with a critical temperature $T_A$, a second assembly of shape memory alloy spring washers $R_B$ with a critical temperature $T_B$ differing from critical temperature $T_A$ and a third assembly formed from conventional elastic washers $R_O$. The thicknesses of each of these assemblies of washers are respectively designated $x_A$, $x_B$ and $x_O$ in FIG. 5, whereas the thickness of the complete stack is designated x. Washers $R_A$ and $R_B$ are both of type R+.

This stack of washers is mounted on a rod I fixed to a plate $P_1$ at one end and whose opposite end is provided with a head $I_1$ on which the stack of washers bears via a flat washer R. At its opposite end, the stack of washers $R_A$, $R_B$ and $R_O$ bears against a second plate $P_2$ traversed by rod I. Finally, part C to which is to be applied a given pressure cycle is placed between plates $P_1$ and $P_2$. As will be shown hereinafter, several assemblies of this type preferably act simultaneously on plates $P_1$ and $P_2$.

At any time, the pressure or load P is the same in each of the three series of washers constituting the stack of FIG. 5. To each of the groups of washers $R_A$, $R_B$ and $R_O$ corresponds a pressure P/thickness x graph of the type shown in FIGS. 1 and 2. The pressure P/thickness x graph representing the behaviour of the overall system is obtained by summating, for a given pressure, each of the three thus obtained graphs.

Thus, whilst the temperature remains below the critical levels $T_A$ and $T_B$ of washers $R_A$ and $R_B$, the pressure/thickness graph representing the behaviour of the assembly is identical to the pressure/thickness graph of the stack of ordinary washers $R_O$, increased by the thicknesses of the washers $R_A$ and $R_B$, which are then flat. The corresponding pressure P/thickness x graph appears at $D_1$ in FIG. 6.

When the temperature is between the critical temperatures $T_A$ and $T_B$, the pressure/thickness graph representing the behaviour of the complete stack corresponds to the sum of the pressure/thickness graphs of the ordinary washers $R_O$ and the shape memory washers $R_A$ above temperature $T_A$, increased by the thickness of washers $R_B$, which are then flat. This graph is shown at $D_2$ in FIG. 6.

Finally, when the temperature exceeds both the critical temperatures $T_A$ and $T_B$, the pressure P/thickness x graph representing the behaviour of the complete stack corresponds to the sum of the pressure/thickness graph of washers $R_O$, $R_A$ and $R_B$ respectively above the critical temperatures $T_A$ and $T_B$ for the latter. The corresponding graph is shown at $D_3$ in FIG. 6.

In the case where part C is made from a relatively incompressible material, the thickness x of the complete stack can be considered as constant and equal to $X_i$. As can be seen in FIG. 6, the pressure P corresponding to said thickness $X_i$ assumes three different values $P_O$, $P_A$ and $P_B$, as a function of whether the temperature is below $T_A$ (graph $D_1$), between $T_A$ and $T_B$ (graph $D_2$), or above $T_B$ (graph $D_3$). Thus, and as is more particularly illustrated in FIG. 7, in the case of a relatively incompressible material, the pressure cycle P applied to part C by the stack of FIG. 5 when the temperature T progressively rises from ambient temperature corresponds to a pressure increase in stages, said pressure passing from the value $P_O$ to the value $P_A$ during the exceeding of the temperaure $T_A$ and then from value $P_A$ to value $P_B$ on exceeding the temperature $T_B$.

An appropriate choice of the washers are $R_O$, $R_A$ and $R_B$ and of their numbers makes it possible to give the desired values to pressures $P_O$, $P_A$ and $P_B$.

FIG. 8 is comparable to FIG. 5 and shows that the stack of washers $R_A$, $R_B$ and $R_O$ on rod I can be formed differently. More specifically, whereas the washers $R_O$ and $R_A$ remain placed between head $I_1$ of rod I and plate $P_2$, washers $R_B$ are interposed in this case between plates $P_1$ and $P_2$, like part C.

As a result of this arrangement and as illustrated in FIG. 9, it is possible to subject part C to a pressure cycle P as a function of the temperature T having a pressure drop during the exceeding of temperature $T_B$. More specifically, when temperature T increases and successively exceeds the critical temperatures $T_A$ and $T_B$, pressure P increases from $P_O$ to $P_A$ on exceeding temperature $T_A$ and then decreases from $P_A$ to $P'_B$ on exceeding the temperature $T_B$.

FIG. 10 very diagrammatically shows a tool using stacks of washers according to the invention and which is intended to carry out the lamination of a composite material part, such as a preimpregnated epoxy/glass composite cap. The part is placed between two plates $P_1$ and $P_2$ interconnected by six rods $I_1$ to $I_6$ regularly distributed over the periphery of the plates. These plates are rectangular and their dimensions are e.g. $300 \times 150$ mm, the diameter of each rod being approximately 12 mm.

The lamination pressure is 3 daN/cm$^2$ and the pressurizing and polymerizing temperatures are respectively 80° C. and 120° C., so that the stacks of washers according to the invention placed on each of the rods $I_1$ to $I_6$ are designed to exert a force of 225 daN above 80° C.

According to the invention, this result is obtained by placing on each of the rods $I_1$ to $I_6$ a stack of four R+ type washers, made from alloy CuZnAl, of external diameter 24 mm, thickness 1 mm in a flat shape and by making them work with a bend or camber below 1 mm. The composition of alloy CuZnAl is chosen with the aid of known tables (cf. the article by E. Aernoudt et al referred to hereinabefore), so that its critical temperature is 80° C.

The thus formed assembly is placed in a ventilated oven and the temperature is progressively raised from ambient temperature to approximately 120° C. at a rate of approximately 2° C. per minute. On passing the critical temperature of 80° C. of the washers, a 0.7 MPa pressure is automatically applied to the part by sacks of washers according to the invention. The part is then kept for approximately 2 hours at 120° C., whilst still being subjected to the pressure of 0.7 MPa by the stacks of washers. It is then freely cooled by simply cutting off the heating, the pressure automatically decreasing during the passage of the critical temperature of 80° C., as a result of the reversibility of the shape memory effect of the alloy from which the washers are made.

An example of applying the stack described hereinbefore with reference to FIG. 8 and making it possible to obtain a pressure cycle including a decreasing part relates to the production of pre-impregnated phenolic resin materials. Thus, a tool comparable to that of FIG. 10 and using stacks of the type shown in FIG. 8 can make it possible to successively perform the polymerization under a pressure $P_A$ at a temperature $T_A$, followed by postcuring at a temperature $T_B$ exceeding $T_A$ and with the application of a pressure $P'_B$ below $P_A$, in order to prevent warping.

I claim:

1. A device for applying pressure developing in stages to a part exposed to a predetermined temperature cycle, said device being characterized in that it comprises at least one stack of elementary washers mounted on a rod provided with abutments at its ends and transversing two pressure plates between which said part is placed, said stack having first and second spring washer means, said first spring washer means including a washer made from a shape memory alloy operable when passing a first predetermined temperature within said temperature cycle to pass from a planar or flat shape to a truncated shape, said second spring washer means including a washer made from a shaped memory alloy operable when passing through a second predetermined temperature different from said first predetermined temperature and within said temperature cycle to pass from a planar or flat shape to a truncated shape, said first and second spring washer means cooperating to apply a first predetermined force to said part upon passing said first predetermined temperature and to apply a second predetermined pressure different from said first predetermined pressure to said part upon passing said second predetermined temperature.

2. Device according to claim 1, characterized in that the stack comprises at least one series of washers mounted in opposition (FIG. 3).

3. Device according to either of the claims 1 and 2, characterized in that the stack comprises at least one series of washers mounted in the same sense (FIG. 4).

4. Device according to claim 1, characterized in that all the washers ($R_O$, $R_A$, $R_B$) of the stack have an identical internal diameter and an identical external diameter.

5. Device according to claim 1, characterized in that at least some of the spring washers ($R_A$, $R_B$) are made from a simple shape memory alloy (S).

6. Device according to claim 1, characterized in that at least certain of the spring washers ($R_A$, $R_B$) are made from a reversible shape memory alloy (R).

7. Device according to claim 1, characterized in that at least some of the washers have a planar shape below a given temperature threshold (+).

8. Device according to claim 1, characterized in that at least some of the washers have a truncated cone shape below a given temperature threshold (−).

* * * * *